United States Patent
Kumaraguruparan et al.

(10) Patent No.: US 11,741,454 B2
(45) Date of Patent: Aug. 29, 2023

(54) SYSTEMS AND METHODS TO GENERATE A LOCATION DEPENDENT ALERT IN A MOBILE DEVICE OF A USER

(71) Applicant: Visa International Service Association, San Francisco, CA (US)

(72) Inventors: Lavanya Kumaraguruparan, Sunnyvale, CA (US); William Warren Ringer, El Granada, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 17/741,681

(22) Filed: May 11, 2022

(65) Prior Publication Data

US 2022/0270071 A1    Aug. 25, 2022

Related U.S. Application Data

(63) Continuation of application No. 16/751,679, filed on Jan. 24, 2020, now Pat. No. 11,354,644, which is a (Continued)

(51) Int. Cl.
G06Q 20/32    (2012.01)
H04W 4/02    (2018.01)
(Continued)

(52) U.S. Cl.
CPC ....... *G06Q 20/3224* (2013.01); *G06Q 20/202* (2013.01); *G06Q 20/227* (2013.01); *G06Q 20/405* (2013.01); *H04W 4/023* (2013.01); *H04W 4/029* (2018.02); *H04W 4/80* (2018.02); *H04M 2203/105* (2013.01); *H04M 2242/14* (2013.01); *H04M 2250/10* (2013.01); *H04W 84/12* (2013.01)

(58) Field of Classification Search
CPC .. G06Q 20/20; G06Q 20/227; G06Q 30/0239; G06Q 20/40; G06Q 20/28; G06Q 10/087; G06Q 20/3224; G06Q 20/36; G06Q 20/4016; G06Q 30/0226
USPC ........ 705/7.31, 7.37, 14.27, 14.53, 26.9, 28, 705/39, 44; 455/414.1
See application file for complete search history.

(56) References Cited

U.S. PATENT DOCUMENTS 8,074,889 B2 * 12/2011 Beenau ................. G07C 9/247
                                                      235/487
8,682,802 B1    3/2014 Kannanari
(Continued)

*Primary Examiner* — Olusegun Goyea
(74) *Attorney, Agent, or Firm* — THE WEBB LAW FIRM

(57) ABSTRACT

A mobile device having a position determination device and a mobile application configured, in response to the location of the mobile device determined by the position determination device, to: predict a transaction based at least in part on the location of the mobile device; select, based at least in part on the location of the mobile device, a first account for the transaction from a plurality of accounts identified by the identification information; and provide, via the user interface, an alert identifying the first account, before a user of the mobile device begins to make the transaction. The prediction can be made based on a location pattern relative to the location of a transaction terminal and/or the detection of short-range wireless signals of the transaction terminal.

20 Claims, 8 Drawing Sheets

Related U.S. Application Data continuation of application No. 16/218,818, filed on Dec. 13, 2018, now Pat. No. 10,579,986, which is a continuation of application No. 15/147,559, filed on May 5, 2016, now Pat. No. 10,185,948.

(60) Provisional application No. 62/157,793, filed on May 6, 2015.

(51) Int. Cl.

| | | |
|---|---|---|
| *G06Q 20/20* | (2012.01) | |
| *G06Q 20/22* | (2012.01) | |
| *H04W 4/029* | (2018.01) | |
| *H04W 4/80* | (2018.01) | |
| *G06Q 20/40* | (2012.01) | |
| *H04W 84/12* | (2009.01) | |

(56) References Cited

U.S. PATENT DOCUMENTS

| | | | |
|---|---|---|---|
| 2001/0027422 A1 | 10/2001 | Brandrud | |
| 2005/0071225 A1 | 3/2005 | Bortolin et al. | |
| 2005/0071227 A1 | 3/2005 | Hammad et al. | |
| 2007/0130244 A1* | 6/2007 | Swanburg | G06Q 30/016 709/200 |
| 2008/0071786 A1* | 3/2008 | Swanburg | G06F 16/162 707/999.009 |
| 2008/0120200 A1* | 5/2008 | Hurtis | G06Q 10/087 705/28 |
| 2008/0133373 A1 | 6/2008 | Perdomo et al. | |
| 2008/0167016 A1* | 7/2008 | Swanburg | H04M 3/4872 455/414.1 |
| 2008/0223918 A1 | 9/2008 | Williams et al. | |
| 2008/0235242 A1* | 9/2008 | Swanburg | H04M 1/72457 |
| 2008/0242274 A1* | 10/2008 | Swanburg | H04L 67/306 455/414.1 |
| 2009/0057396 A1 | 3/2009 | Barbour et al. | |
| 2009/0112766 A1 | 4/2009 | Hammad et al. | |
| 2010/0145788 A1 | 6/2010 | Kardokas | |
| 2010/0211445 A1 | 8/2010 | Bodington | |
| 2010/0280882 A1* | 11/2010 | Faith | G06Q 40/12 705/7.37 |
| 2011/0251883 A1 | 10/2011 | Satyavolu et al. | |
| 2012/0066050 A1 | 3/2012 | Satyavolu et al. | |
| 2012/0101881 A1 | 4/2012 | Taylor et al. | |
| 2012/0259732 A1* | 10/2012 | Sasankan | H04W 4/029 705/26.9 |
| 2013/0024371 A1 | 1/2013 | Hariramani et al. | |
| 2013/0233922 A1* | 9/2013 | Schoening | G06Q 10/063114 235/385 |
| 2013/0297416 A1 | 11/2013 | Dipaola et al. | |
| 2013/0332273 A1* | 12/2013 | Gu | G01S 5/0027 701/428 |
| 2014/0074575 A1 | 3/2014 | Rappoport | |
| 2014/0094273 A1 | 4/2014 | Nguyen | |
| 2014/0180793 A1 | 6/2014 | Boal | |
| 2014/0207550 A1 | 7/2014 | Eden et al. | |
| 2014/0278892 A1* | 9/2014 | Collart | G06Q 30/0226 705/14.27 |
| 2014/0279474 A1* | 9/2014 | Evans | G06Q 20/40 705/41 |
| 2015/0026006 A1* | 1/2015 | Jackson | G01C 21/3811 705/26.8 |
| 2015/0088626 A1 | 3/2015 | Salmon et al. | |
| 2015/0088633 A1 | 3/2015 | Salmon et al. | |
| 2015/0120429 A1 | 4/2015 | Salmon et al. | |
| 2015/0149272 A1 | 5/2015 | Salmon et al. | |
| 2015/0227934 A1* | 8/2015 | Chauhan | G06Q 20/3224 705/44 |
| 2015/0242869 A1* | 8/2015 | Unser | G06Q 30/0205 705/7.31 |
| 2015/0262118 A1* | 9/2015 | Grissom | G06Q 10/08 700/214 |
| 2015/0269553 A1* | 9/2015 | Barrett | G06Q 20/28 705/39 |
| 2015/0288637 A1 | 10/2015 | Celikyilmaz et al. | |
| 2015/0294312 A1* | 10/2015 | Kendrick | G06Q 20/40 705/44 |
| 2015/0379554 A1* | 12/2015 | Copeland | G06Q 30/0239 705/14.39 |
| 2016/0192123 A1 | 6/2016 | Lim | |
| 2016/0225011 A1 | 8/2016 | Shah et al. | |
| 2016/0239733 A1* | 8/2016 | Hertz | H04W 4/029 |
| 2016/0275480 A1 | 9/2016 | Sanaboyina et al. | |
| 2018/0096327 A1* | 4/2018 | Barrett | G06Q 20/20 |

* cited by examiner

SYSTEMS AND METHODS TO GENERATE A LOCATION DEPENDENT ALERT IN A MOBILE DEVICE OF A USER

RELATED APPLICATIONS

The present application is a continuation application of U.S. patent application Ser. No. 16/751,679, filed Jan. 24, 2020, which is a continuation application of U.S. patent application Ser. No. 16/218,818, filed Dec. 13, 2018, now U.S. Pat. No. 10,579,986, issued Mar. 3, 2020, which is a continuation application of U.S. patent application Ser. No. 15/147,559, filed May 5, 2016, now U.S. Pat. No. 10,185,948, issued Jan. 22, 2019, which claims the benefit of U.S. Prov. Pat. App. No. 62/157,793, filed May 6, 2015, the entire disclosures of which applications are hereby incorporated herein by reference.

The present application relates to U.S. patent application Ser. No. 14/984,762, filed Dec. 30, 2015, and U.S. Pat. App. Pub. Nos. 2009/0112766, 2013/0024371, 2010/0211445, and 2005/0071225, and 2005/0071227, the entire disclosures of which applications are hereby incorporated herein by reference.

FIELD OF THE TECHNOLOGY

At least some embodiments disclosed herein relate to location dependent operations of computing devices.

BACKGROUND

Many technologies have been developed to determine, in real time, the current location of a device. For example, satellites in the global positioning system (GPS) transmit radio frequency signals from different positions in the space; and a GPS receiver receives the signals from the satellites and determines its position from the timing differences of the received signals. For example, a cellular communication device can determine or estimate its location based on cellular communication signals from basestations. For example, a wireless communication device can be configured to compute its location based on signals from a wireless communication access point.

The availability of location information of a mobile device allows the development of various location dependent services. For example, U.S. Pat. App. Pub. No. 2001/0027422 discloses a system configured to pay for location dependent services using a cellular phone as a payment device, where a service location provides a user requested service or goods based on the approximate geographical position of the cellular phone.

U.S. Pat. App. Pub. No. 2009/0112766, entitled "Device Including Multiple Payment Applications", discloses a method to automatically select one or more payment applications, such as credit cards, debit cards, to use in a transaction so that the selected payment applications give the consumer an optimized benefit or benefits. The method can be implemented in portable consumer devices, such as phones. For example, a portable consumer device stores payment applications corresponding to payment cards. After the portable consumer device receives transaction information about the items being purchased from a point-of-sale device, the portable consumer device determines which of the payment applications stored in it will give the consumer the optimal benefit. For example, after receiving the transaction information, the portable consumer device determines that the consumer is purchasing groceries and then determines the payment application that provides the optimum benefit for the consumer for the current transaction.

U.S. Pat. App. Pub. No. 2013/0024371, and entitled "Electronic Offer Optimization and Redemption Apparatuses, Methods and Systems", discloses an e-wallet account that can hold payment accounts, such as a credit card, a debit card, etc. After receiving a purchase order request via the consumer wallet device, the system determines an optimized payment card and offer selection based on the user payment card and offer selection preference data to execute a payment transaction using the optimized payment card and offer selection in response to the purchase order request.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
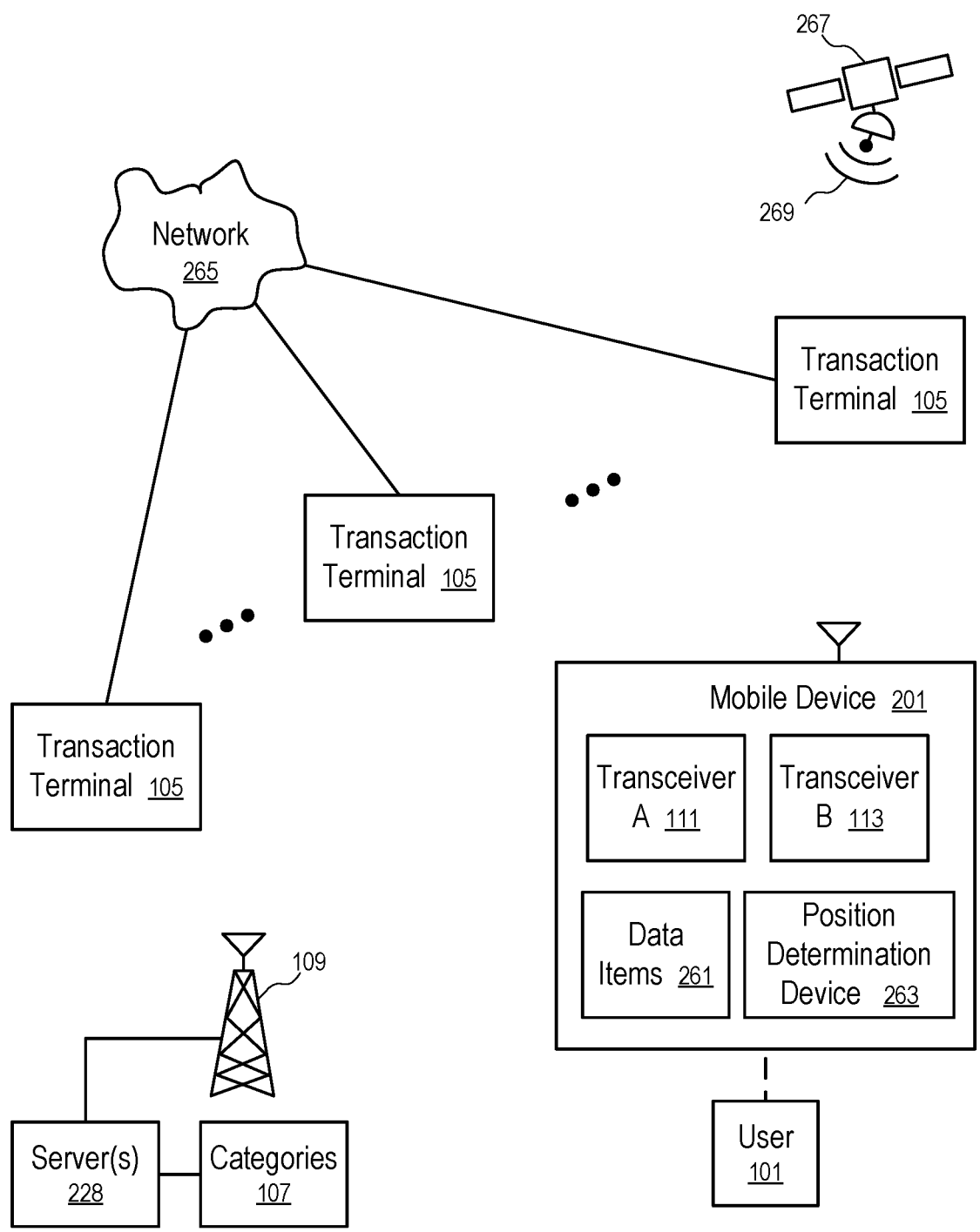
FIG. 1 shows a system configured to facilitate location dependent communications between mobile devices and transaction terminals according to one embodiment.

FIG. 1 shows a system configured to facilitate location dependent communications between mobile devices and transaction terminals according to one embodiment.

In FIG. 1, the system is configured to optimize, based on the location of the mobile device (201), the communication between a mobile device (201) of a user (101) and transaction terminals (105). The transaction terminals (105) are connected to a network (265); and the mobile device (201) is capable of communicating separately with the transaction terminals (105) and at least one remote server (228) that may or may not be connected to the network (265).

The mobile device (201) is configured to use the position determination device (263) to determine its current position. For example, the position determination device (263) of one embodiment is a GPS receiver configured to receive GPS signals (269) from GPS satellites (e.g., 267) and/or similar signals from basestations. Other position determination techniques can also be used. For example, the position determination device (263) of one embodiment is configured to determine its position based on signals from basestations (e.g., 109) for cellular communications, and/or signals from access points of wireless local area networks (WLAN).

In FIG. 1, in preparation for a communication session with one of the transaction terminals (105), the mobile device (201) is configured to communicate with the server (228) to sort or adjust the order of the data items based on the current location of the mobile device (201). Optionally, the mobile device (201) may present a user interface that allows the user (101) to view the adjusted order and/or further manually adjust the order through the user interface. In the communication session, the mobile device (201) is configured to present the data items (261) in that order that is optimized based at least in part on the location of the mobile device (201) and thus reduces the duration of the communication session and/or the user effort on the user interface to direct the communications between the mobile device (201) and the respective one of the transaction terminals (105).

In one embodiment, the mobile device (201) is configured to have at least two wireless communication transceivers: a shorter range transceiver (111) for communication with one of the transaction terminals (105) that is in close proximity to the mobile device (201) (e.g., via Near Field Communication (NFC)); and, a longer range transceiver (113) for communication with a remote server (228) (e.g., via cellular telecommunications, WiFi/wireless local area network).

Periodically, the mobile device (201) of one embodiment communicates with the server (228) via the longer range transceiver (113) to adjust the order of the data items such that the order of the data items is optimized for a potential communication session with a transaction terminal (105) in the vicinity of the mobile device (201) using the shorter range transceiver (111).

For example, the mobile device (201) transmits its current geographical location, computed by the position determination device (263), using the longer ranger transceiver (113) to the server (228). In response, the server (228) identifies a category based on the location received from the mobile device (201) and communicates the category to the mobile device (201), which adjusts the order of the data items (261) according to the category. In some embodiments, the mobile device (201) postpones the adjustment of the order until a communication session with a transaction terminal (105) is about to be initiated using the shorter ranger transceiver (111), or during the initiation of the communication session with the transaction terminal (105).

For example, the server (228) is configured to store data identifying the categories (107) of different transaction terminals (105) arranged at different locations. Based on the current location of the mobile device (201), the server (228) is configured to identify one or more transaction terminals (105) that are closest to the current location of the mobile device (201) and determine a category of a transaction terminal (105) with which the mobile device (201) is most likely to initiate a communication session at or near the location reported by mobile device (201). In one embodiment, the most likely transaction terminal is determined further based on the communication history of the mobile device (201) with different transaction terminals. Since the mobile device (201) stores the data items (261) with priority preference information in association with various categories, the priority category identified by the server (228) allows the mobile device (201) to adjust and/or update the priority order of the data items (261).

In one embodiment, the mobile device (201) monitors its current location determined by the position determination device (263). When the current location of the mobile device (201) has changed significantly from the location previously communicated to the server (228) (e.g., relative to the average spacing of transaction terminals in the area), the mobile device (201) communicates with the server (228) to obtain an update for the category used to optimize the order of the data items (261). Thus, the communications with the server (228) can be reduced.

In some embodiments, after determining the priority category based on the current location of the mobile device (201), the server (228) is configured to further identify the optimized order of the data items (261) and communicate the updated order to the mobile device (201), with or without explicitly identifying the priority category to the mobile device (201).

In one embodiment, optimizing the order of the data items (261) includes selecting a top-ranked data item to be communicated first to a transaction terminal (105). The mobile device (201) of one embodiment is configured with a user interface that allows the user (101) to optionally view an identification of the top-ranked data item prior to the mobile device (201) communicating the top-ranked data item to a transaction terminal (105). Using the user interface the user (101) may optionally select a different data item for communicating to the transaction terminal (105). The optimization of the order of the data items (261) can reduce the need that the user optionally using the user interface for viewing the top-ranked data item and/or select a different data item to replace the top-ranked data item. In one embodiment, the user inputs made via the user interface are further tracked and used in the optimization of the order of the data items (261) to minimize future user inputs.

In one embodiment, the mobile device (201) is configured to generate an alert identifying the top-ranked data item to the user of the mobile device prior to the communication of the top-ranked data item to the transaction terminal (105). For example, in response to a predication of a transaction with the transaction terminal (105) based on the location and/or recent location pattern of the mobile device (201), the alert causes the user to open a mobile application running in the mobile device (201). The mobile application identifies the top-ranked data item in a user interface, allowing the user to confirm its communication by the mobile device (201) to the transaction terminal (105) in a subsequent communication session, or by a separate device used by the user. The alert allows the mobile device (201) and/or its user to be well prepared for the communication session with the transaction terminal (105) and thus reduces the time period of the communication session while the user is in the process of approaching the transaction terminal (e.g., waiting in a queue to reach the transaction terminal). Thus, the overall performance of the system including the transaction terminal is improved.

The technique discussed above can be used to optimize the presentation of account numbers from a mobile wallet to a transaction terminal. For example, the data items (261) may be account numbers of payment accounts in a mobile wallet configured in the mobile device (201). Different payment accounts may offer different benefits for payments made for purchases in different merchant categories. Based on the merchant categories of the transaction terminals (105) connected in the network (265) (e.g., an electronic payment processing network illustrated in FIG. 7), the server (228) (e.g., a portal of the network (265)) is configured to use the location reported by the mobile device (201) (and/or other information, such as data recording the past transactions made in the payment accounts configured in the mobile wallet) to identify a merchant category for prioritization, allowing the mobile device (201) to re-arrange the order of the account numbers in the mobile wallet to present first the account number that can potentially provide the best benefits to the payment transaction to be made on a transaction terminal (105) that is in close proximity to the mobile device (201). For example, the mobile wallet may present a user interface to identify the top ranked payment account for confirmation by the user in the transaction with the nearby transaction terminal (105). For example, the mobile wallet may use the top ranked payment account as the default account for the transaction with the nearby transaction terminal in absence of user input. For example, the mobile wallet may use the payment accounts sequentially according to the optimized order to process the payment until the payment is satisfied.

Mobile payment wallet services, such as Apple Pay and Google Wallet, allow a user (101) to store multiple credit cards on a mobile device (201).

In one embodiment, a mobile wallet application is configured to use geolocation to determine the order of the credit cards (and/or other payment accounts, such as debit cards, prepaid cards) in which the payment accounts are presented to make a payment at a transaction terminal, such as a point of sales terminal of a merchant.

For example, the mobile wallet may use the top ranked payment account to make the payment without the user having to manually select a payment account from the plurality of payment accounts configured in the mobile wallet. Optionally, the mobile wallet may show the sorted list of payment accounts to allow the user to select a payment account to make the payment at the point of sales terminal of the merchant.

In one embodiment, the order of the credit cards is determined before the mobile wallet is used to make a payment and/or before the mobile wallet communicates with the points of sales terminal to reduce the processing/waiting time at the point of sales terminal. For example, in response to a determination that the mobile device is having a location inside a retail location, the mobile wallet may optimize the order based on reward optimization and/or user preferences.

For example, in one embodiment, the mobile wallet is configured to determine the type of the merchant of the retail store in which the mobile device is currently and determine which payment card is to be automatically selected at the time of purchase, checkout, or payment.

In some embodiments, the mobile wallet is further configured to identify the loyalty programs acceptable the point of sales terminal of the merchant and communicate information from the mobile wallet to the point of sales terminal to identify the member information of the user of the mobile wallet. For example, a point of sales terminal of a merchant may accept the phone number of the user as an identifier of a member in the reward program of the merchant. For example, a point of sales terminal of a merchant may accept a member ID of the user issued by the merchant to the user in the reward program of the merchant. In one embodiment, the reward membership information is transmitted to the point of sales terminal of the merchant prior to, or together with, the payment information that identifies a payment account of the user. In one embodiment, the payment information is a token or a one-time account that represents, or is associated with, the payment account of the user.

For example, loyalty programs associated with payment cards may provide rewards of different levels for payments with merchants of different types. For example, the loyalty program of one card may offer better rewards on gas purchases than restaurant purchases. For example, a user may prefer to use a particular payment card to make one type of purchases and another payment card to make another type of purchases, for reasons may or may not related to rewards. In one embodiment, the mobile wallet is configured to determine the merchant type based on the location coordinates of the mobile device and then automatically rank the payment accounts based on predicted rewards benefits and/or user preferences.

In one embodiment, when the mobile wallet is used to make a payment at the point of sales terminal of a merchant, the mobile wallet uses the top ranked payment account. Alternatively or in combination, the mobile wallet may provide a user interface that allows the user to reject the use of the top ranked payment account and/or select an alternative payment account. The ranking according to the optimization of the reward benefits and/or pre-specified user rules can reduce and/or eliminate the need for user intervention to select a payment account from the mobile wallet and thus reduce the time at the point of sales terminal and improve the overall efficiency of the payment system.

In one embodiment, the mobile wallet application will automatically select the better rewards card to use depending on the identity of the merchant determined based on the location of the mobile device.

In one embodiment, after multiple payment cards are configured and/or stored in a mobile wallet on the mobile device, the mobile wallet allows the user to select the option of using a default card to make payments. In one embodiment, the default card is dynamically determined based on location coordinates of the mobile device.

For example, in one embodiment, for one or more of the payment cards, the mobile wallet presents a user interface allowing the user to specify merchant attributes, such as merchant types (e.g., gas, drug store, restaurant), etc., such that when the current location of the mobile device is determined to have the merchant attributes specified for the corresponding payment card, the mobile application is configured to identify the corresponding payment card as the default card for the current location.

In one embodiment, when the merchant attribute determined for the current location satisfies none of the payment cards in the mobile wallet, a predetermined card is selected as the default card.

In one embodiment, when the merchant attribute determined for the current location satisfies more than one of the payment cards in the mobile wallet, the payment cards are ranked based on prior selection histories and the reward rules of the reward programs associated with the payment cards.

For example, the issuers of the payment cards may communicate the latest rewards information to the mobile wallet application. The reward program of a payment card may specify rewards as different percentage of transaction amounts based on different merchant types corresponding to different merchant category codes; and the association of the reward percentages with respective merchant categories may change periodically (e.g., monthly, quarterly). Using the reward percentage information and/or user preferences, the mobile wallet application is configured to dynamically rank the payment accounts in a preferred order for making payments. Thus, the user does not have to manually select a default card for a particular combination of merchant attributes.

The feature of the mobile wallet to dynamically rank the payment accounts configured in the mobile wallet would prompt competition among issuers and/or loyalty programs to offer better rewards than their competitors in order to become the "top of the wallet" credit card.

In one embodiment, a location determination system of the mobile device, such as a global positioning system (GPS) receiver in a smart phone, can be used to determine the location coordinates of the current location of the mobile device and thus look up the merchant and corresponding merchant attributes based on the location coordinates.

For example, the geolocation feature on a smart phone can determine the merchant at the current location of the smart phone; and a database stored in the cloud can be used to determine the merchant type of the merchant.

In one embodiment, the mobile wallet is configured to weigh the reward benefits predicated based on the merchant category of the current location and preferences of the users to compute a score for each of the payment accounts. The scores of the payment accounts are used to rank the payment accounts in the mobile wallet. The mobile wallet allows the user to select payment accounts for the dynamically sorted list of payment accounts to make a payment. The user selection is used with a machine learning technique to train the weights in the computation of the scores and thus reflect the user preference. Over a period of time, the mobile wallet is capable of presenting payment accounts in desirable orders that reflects both the optimization of reward benefits and user preferences. Thus, the accuracy of the top ranked payment card for making a payment at a location is improved.

In one embodiment, the mobile device is configured to automatically retrieve reward rules from issuers of the payment accounts and/or the respective loyalty program providers.

Figure 2:
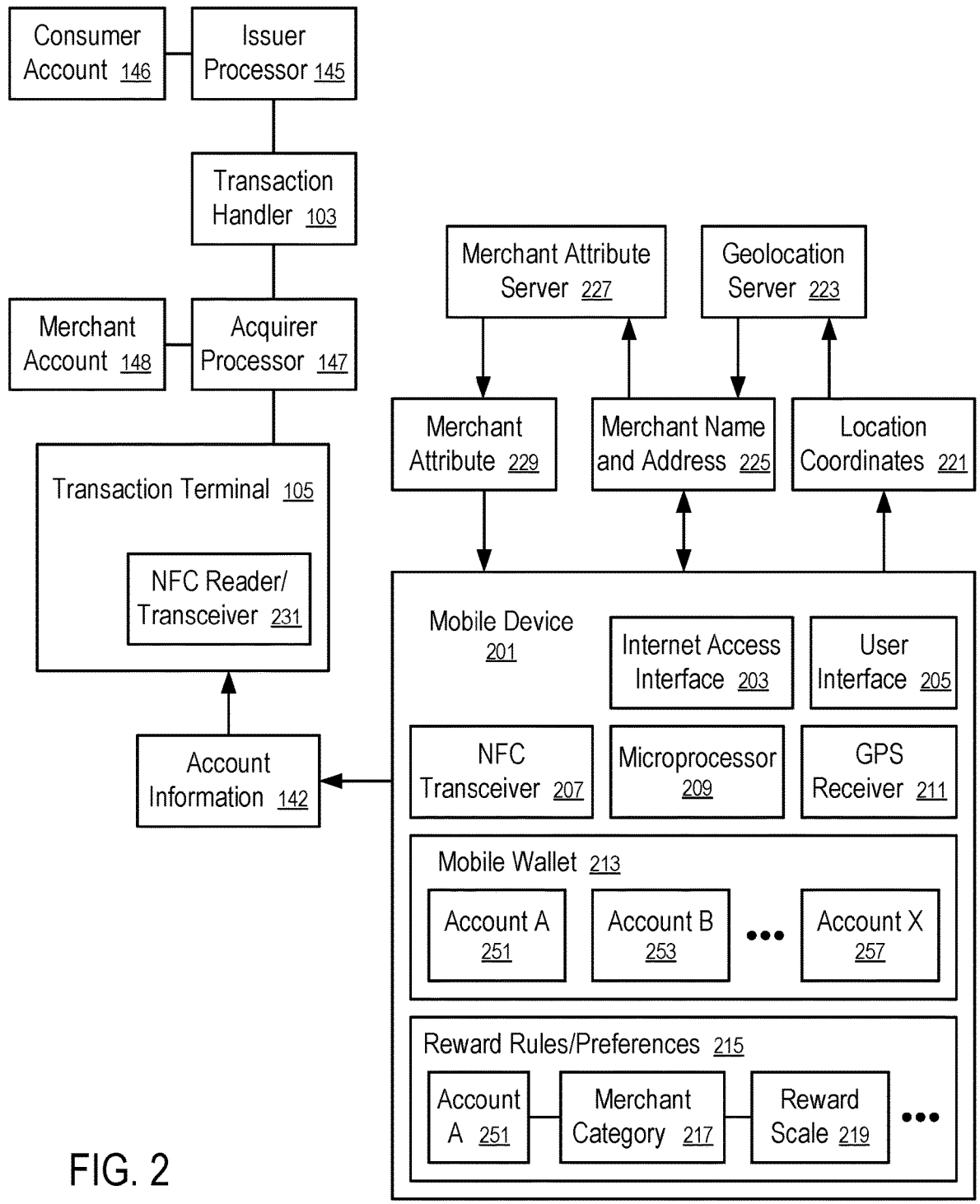
FIG. 2 shows a system to present account information according to one embodiment.

FIG. 2 shows a system to present account information according to one embodiment. In FIG. 2, the mobile device (201) has a GPS receiver (211) configured to determine the location coordinates (221) of the current location of the mobile device (201). The mobile device (201) has at least one internet access interface (203) for communication with remote servers. Examples of such an internet access interface (203) include a cellular communications transceiver, a wireless local area network transceiver, etc.

In FIG. 2, a geolocation server (223) provides Application Programming Interfaces (API) that allow the mobile wallet (213), implemented as a mobile application executed by the microprocessor (209) in the mobile device (201), to submit location coordinates (221) of the current location of the mobile device (201) and retrieve various information about that location, such as the name and address (225) of a merchant that contains the location.

For example, APIs of Google Places accept the latitude and longitude as inputs to obtain the name and address of the business at the location.

In FIG. 2, a merchant attribute server (227) stores a table to look up the merchant attribute (229), such as the merchant category code (MCC) of the merchant identified by the merchant name and address (225).

For example, APIs of Visa Supplier Locator can provide the MCC of 5541 and 5542 for "Shell Oil" and "2901 S NORFOLK ST SAN MATEO Calif. 94403".

In FIG. 2, the mobile wallet (213) stores a set of data identifying payment accounts (251, 253, . . . , 257).

In one embodiment, the mobile wallet (213) has a user interface (205) that allows the user (101) to specify, for each of the accounts (251, 253, . . . , 257), a merchant category code group. For example, the user interface (205) provides options such as "gas" and "grocery stores". The user may select the "gas" group of merchant category code for Account A (251), and the "grocery stores" group of merchant category code for Account B (253).

In one embodiment, the user interface (205) is configured to allow the user to select an account (e.g., 257) as a default account and thus being associated with all merchant categories. When the mobile wallet (213) is used at a location having a merchant category code that is not associated with other accounts (e.g., 251, 253, . . . ), the default account is considered a match.

In one embodiment, the user selection of the merchant category code groups for association with the accounts (e.g., 251, 253, . . . , 257) represents the user preferences of the accounts. For a given set of merchant category codes associated with the current location of the mobile device (201), the mobile wallet (213) is configured to determine matching scores of the accounts (251, 253, . . . , 257) configured in the mobile wallet. In one embodiment, the more merchant category codes an account has that do not match with the merchant category codes associated with the current location, the lower the matching score of the account for the current location.

In one embodiment, the mobile wallet is configured to periodically retrieve from the loyalty programs and/or issuers of the accounts (251, 253, . . . , 257) the reward rules (215).

For example, the Chase's Freedom Card offers a promotion where, for three months, restaurant purchases would earn 5% cash back. The mobile wallet associates the account (251) with the merchant category (217) (e.g., restaurant) and with the reward scale (291) (e.g., 5% cash back) as part of the reward rules (215).

In one embodiment, the matching score includes the weight of the reward scale. For example, the higher the reward scale, the larger is the added weight for matching with the merchant category of the account (e.g., 251).

In one embodiment, when a user (101) selects a merchant category group (217) for association with an account (251), the user interface (205) allows the user (101) to specify a reward scale (291). The reward scale (291) quantifies the user preference, which can be compared with the corresponding reward scales (219) of reward rules. Thus, the user preference and the reward rules can be considered in a unified matching score.

Further, in one embodiment, the mobile wallet is configured to adjust the user specified reward scale (219) according to usage patterns of the mobile wallet to optimize the scoring to improve the accuracy in predicting the payment account the user (101) would like to use at a location of a given set of merchant category codes.

In one embodiment, after the determination of the merchant attribute (229) (e.g., merchant category codes) for the location determined by the GPS receiver (211), the mobile wallet (213) sorts and/or selects a top matching account (e.g., 251) as the "top of the wallet" account.

For example, in FIG. 2, the mobile device (201) includes an NFC transceiver (207) to communicate account information (142) to the NFC reader/transceiver (231) of the transaction terminal (105) of the merchant to make the payment using the account information (42) that identifies the "top of the wallet" account.

In one embodiment, the user interface (205) is configured to optionally show the list of sorted accounts and allow the user to select an account for the payment transaction at the current location, before the mobile wallet (213) communicates the account information (142) to the transaction terminal (105). If the "top of the wallet" account is not selected, the mobile wallet (213) adjusts the reward preference (215) (e.g., via a machine learning technique) to improve the accuracy in predicting the "top of the wallet" account. Thus, over a period of time, the accuracy of predictions of the mobile wallet become satisfactory; and the user may simply use the mobile wallet (213) to make the payment using the "top of the wallet" account identified by the mobile wallet (213), without requesting a view of the list accounts (251, 253, . . . , 257) that is dynamically ordered according to the merchant category codes of the location coordinates (221) determined by the GPS receiver (211).

In FIG. 2, the transaction terminal (105) is connected to an electronic payment processing network, which includes an acquirer processor (147) controlling the merchant account (148) and the issuer processor (146) controlling the consumer account (146) identified by the account information (142). The transaction handler (103) interconnects the issuer processors (e.g., 145) and the acquirer processors (e.g., 147) in the electronic payment processing network.

Figure 3:
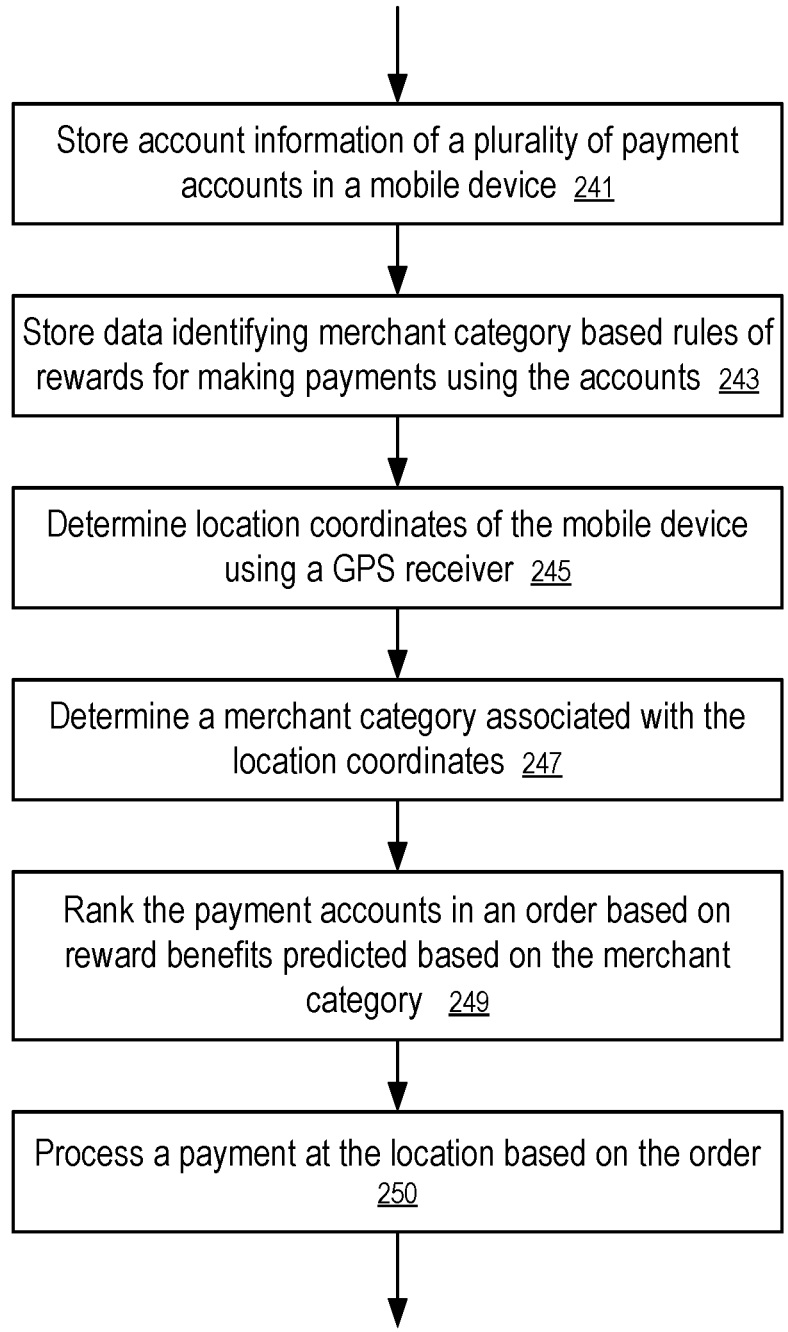
FIG. 3 shows a method to process a payment based on a location of a mobile device according to one embodiment.

FIG. 3 shows a method to process a payment based on a location of a mobile device according to one embodiment. For example, the method of FIG. 3 can be implemented in the system of FIG. 2.

In FIG. 3, a computing apparatus is configured to: store (241) account information of a plurality of payment accounts in a mobile device; store (243) data identifying merchant category based rules of rewards for making payments using the accounts; determine (245) location coordinates of the mobile device using a GPS receiver; determine (247) a merchant category associated with the location coordinates; rank (249) the payment accounts in an order based on reward benefits predicted based on the merchant category; and process (250) a payment at the location based on the order of the payment accounts.

In one embodiment, the mobile device (201) is configured to automatically communicate member ID of the user in a merchant loyalty program to the POS during the payment processing and thus eliminates the need to separately identify the membership (e.g., by swiping the loyalty card from the merchant, or entering the phone number of the user to indicate the membership).

In one embodiment, payment accounts in a mobile wallet implemented in a mobile device are sorted and selected for payment transactions based on the location coordinates determined by the location determination system of the mobile device. For example, after the global positioning system (GPS) receiver of the mobile device determines its current location coordinates, the mobile device is configured to determine one or more attributes associated with the location coordinates. A set of rules are applied to score the payment accounts based on the attributes and sort the payment accounts in the mobile wallet based on the scores. When the mobile wallet is used to make a payment, the payment accounts are presented in the sorted order for making the payment.

In one embodiment, a mobile application of a user implemented in the mobile device (201) is configured to predict a payment transaction based on the location of the mobile device (201) and generate a dynamic alert that suggests the use of a particular payment account (e.g., 251, 253, . . . , or 257), selected from a plurality of payment accounts (e.g., 251, 253, . . . , or 257) of the user, to maximize the benefits resulting from the predicted payment transaction, before the authorization of the payment transaction is initiated with a transaction terminal (105).

For example, as discussed above, the mobile application can be configured to compute the best payment card for a transaction according to the current location of the mobile device (201) and provides an alert to the user before the user makes the payment and before the transaction is initiated. For example, the mobile application communicates with a remote server (228) to obtain and store rules of loyalty offers associated with the payment accounts of the user. When the mobile application detects that the user is about to make a payment transaction at a merchant location, the mobile application calculates the best account for the payment transaction and provides an alert to the user to use the payment account that is calculated to offer the maximal benefits. As a result of the system, the user is provided with the just-in-time information to select the payment card to obtain maximized reward benefits.

For example, the mobile application may use a location determination device (e.g., a GPS receiver) to monitor the location of the mobile device in relation with locations of transaction terminals. When the monitored location of the mobile device approaches a location of a transaction terminal in a pattern that is consistent with movements of customers approaching the transaction terminal to make payments, the mobile application predicts the payment transaction, identifies a payment account for maximizing or optimizing the loyalty reward benefits resulting from the payment transaction, and generates an alert to the user about the identified payment account.

For example, a set of predetermined conditions can be used to detect whether or not the movement and/or the location of the mobile device in relation with the location of a transaction terminal represents a predicted payment transaction.

For example, when the location of the mobile device is within a predetermined distance for a time period longer than a threshold, the mobile application is configured to predict that a payment transaction is about to be made using the transaction terminal.

For example, when the direction of the movement of the mobile device is towards the transaction terminal and the speed of the movement of the mobile device is within a predetermined range, a payment transaction on the transaction terminal is predicted.

For example, when a trajectory of recent locations of the mobile device is projected towards the location of the transaction terminal, a payment transaction on the transaction terminal is predicted.

For example, a machine learning technique can be used to establish a predictive model that computes the probability of a payment transaction at a transaction terminal from a timed-sequence of locations in the vicinity of the location of the transaction terminal, based on a training set of location data of mobile devices that have locations in the vicinity of the transaction terminal and that have known statuses as to whether or not the users of the mobile devices have made the payment transactions on the transaction terminal following the location pattern. The model can be further trained to compute the predicted time period leading towards the predicted transaction on the transaction terminal. Thus, after the mobile device (201) determines that it is within a threshold distance from a transaction terminal (105), the mobile application running in the mobile device (201) tracks a timed-sequence of locations of the mobile device (201), uses the model to predict the probability of a transaction with the transaction terminal (105) and/or the predicted time period before the predicted transaction. When the predicted probability is above a threshold and/or the predicted time period before the predicted transaction is below a threshold, the mobile device (201) generates an alert for the user.

When the mobile device (201) is inside a building, an indoor position determination system used to determine the position of the mobile device (201) within the building may use signals other than GPS signals from satellites. For example, the location of the mobile device (201) inside the building can be determined based on wireless beacon signals, RFID readers, and/or other technologies.

Alternatively or in combination, the mobile device (201) may scan for wireless signals transmitted from a communication device (e.g., 231) of a transaction terminal (105). A payment transaction on the transaction terminal can be predicted based on the detection of the wireless signals emitted from the communication device (e.g., 231) of the transaction terminal (105) and/or the strength of the detected signals.

In some embodiments, the next transaction is predicted based at least in part on the pattern in the transaction data (109) of the past payment transactions in the accounts (251, 253, . . . , 257) of the user. For example, if the transaction data (109) indicates that the user regularly make transactions at the location and/or within the time window in a day (and/or days in the week), the mobile application can compute the probability of the user making a transaction at the transaction terminal within a predetermined time window. When the probability is above a threshold, a transaction is predicted.

Figure 4:
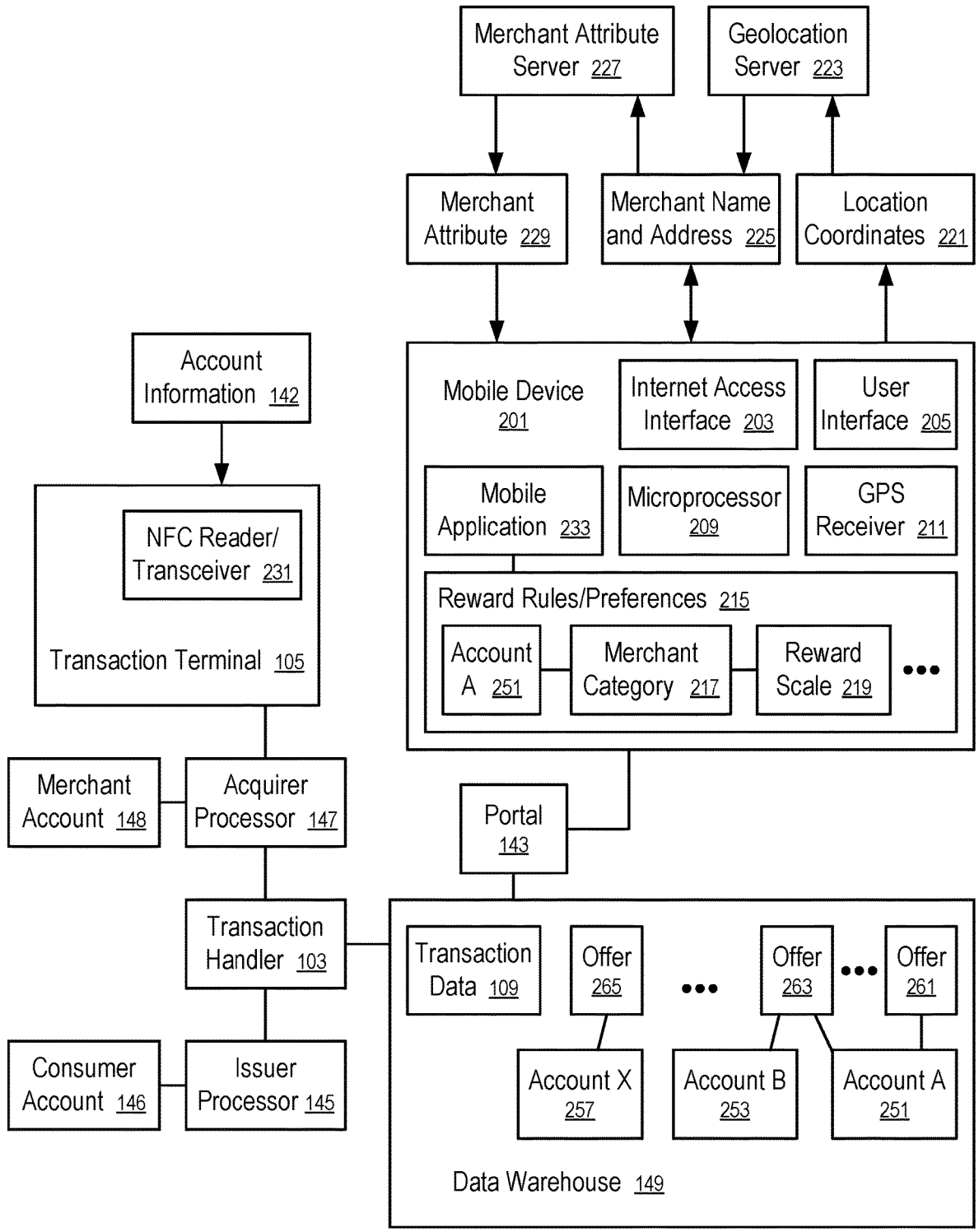
FIG. 4 shows a system to generate a mobile alert according to one embodiment.

FIG. 4 shows a system to generate a mobile alert according to one embodiment.

In FIG. 4, the mobile application (233) running in the mobile device (201) (in the form of a set of instructions being executed by the microprocessor (209)) is configured to obtain and store the reward rules and/or preferences (215) from the portal (143) when a communication connection between the portal (143) and the mobile device (201) is available. When the mobile device is in the vicinity of the transaction terminal (105), the communication connection between the portal (143) and the mobile device (201) may or may not be available The reward rules and/or preferences (215) stored in the mobile device (201) allow the mobile application (233) to sort the accounts (251, 253, . . . , 257) of the user of the mobile device (201) according to reward benefits applicable to a payment transaction that is predicted to be made on a transaction terminal (105). The prediction can be made based the location of the mobile device (201) as determined by the GPS receiver (211), or another location determination device, and/or the detection of a wireless signal from the transaction terminal (105), such as a signal from the NFC reader transceiver (231) (e.g., detected via a NFC transceiver (207) illustrated in FIG. 2, or another wireless receiver).

Figure 7:
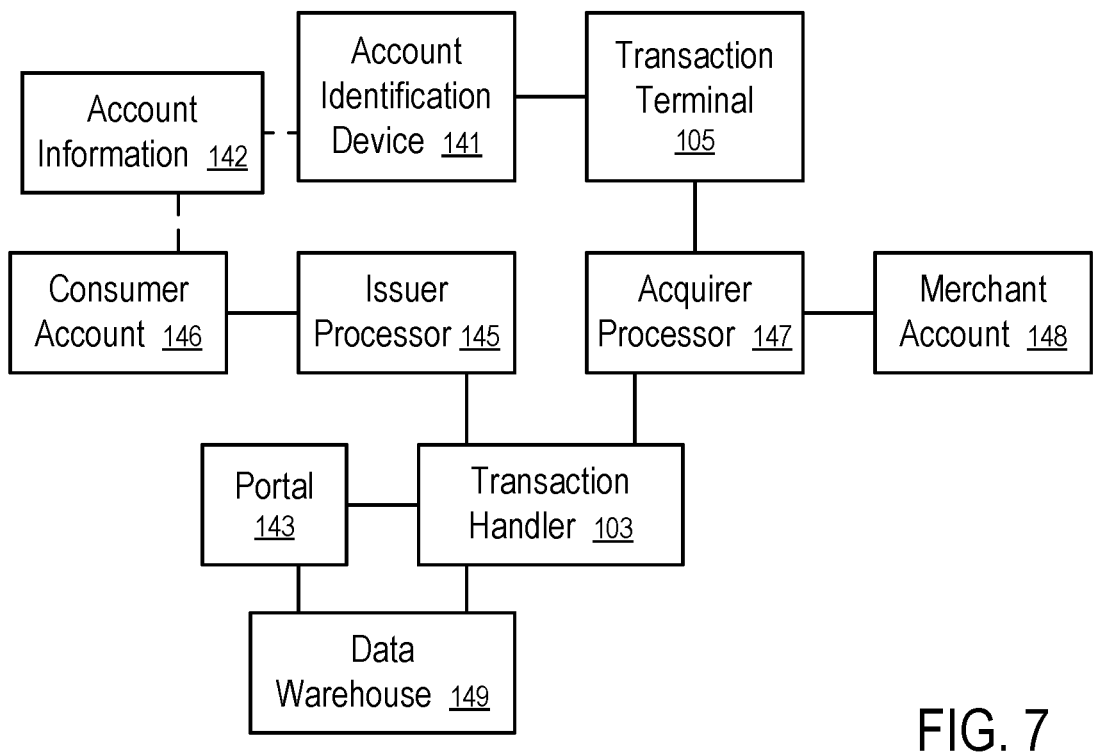
FIG. 7 shows an electronic payment processing system according to one embodiment.

In one embodiment, the accounts (251, 253, . . . , 257) are associated with loyalty offers (261, 263, . . . , 265) in the data warehouse (149) coupled with the transaction handler (103) of the electronic payment processing network illustrated in FIG. 7. The data warehouse (149) functions as a centralized location for the mobile devices (201) of the user to obtain and/or update the reward rules/preferences (215). Thus, once the user uses the mobile application (233) running in one of the mobile devices (201) of the user to update the reward rules/preferences (215), the update is transmitted to portal (143) and stored in the data warehouse (149) in a synchronization operation when the connection between the portal (143) and the mobile device (201) is available. Subsequently, other mobile devices (201) running the mobile application (233) can download the update from the portal (143) in their synchronization operations.

In FIG. 4, the data warehouse (149) is further configured to store the transaction data (109) recording the payment transactions processed via the transaction handler (103) in the electronic payment processing network.

In FIG. 4, when the payment transaction is predicted, the mobile application (233) is configured to rank the accounts (251, 253, . . . , 257) according to the reward benefits (and/or user preferences), through the use of the Geolocation server (223) and the merchant attribute server (227) in a way as illustrated in FIG. 2. Then, the mobile application (233) presents an alert in the user interface (205).

In some embodiments, the merchant attribute server (227) is implemented in the portal (143).

In some embodiments, the portal (143) is configured to rank the accounts (251, 253, . . . , 257) and transmit the ranked results to the mobile device. For example, the mobile application (233) running in the mobile device (201) is configured in one embodiment to periodically report its current location determined by its location/position determination device (e.g., GPS receiver (211)) to the portal (143). The frequency of the report can be dynamically adjusted based on the distance between the current location of the mobile device (201) and the location of the nearest transaction terminal (105) identified in the data warehouse (149). The frequency increases when the distance decreases. When a transaction is predicted by the portal (143) (e.g., based on the location trajectory of the mobile device (201) and/or the transaction data (109) recording the past transactions of the accounts (251, 253, . . . , 257)), the portal (143) ranks the accounts (251, 253, . . . , 257) and transmits a message to the mobile device (201) and/or the mobile application (233), which causes an alert to be presented on the user interface (205).

For example, the alert can be presented in the form of a notification produced in the mobile operating system of the mobile device (201). The notification may cause an audio clip being played on the user interface (205) of the mobile device (201), a period of vibration of the mobile device (201), and/or the presentation of a notification icon and/or a message on the screen of the mobile device (201).

In FIG. 4, the alert of one embodiment presented in the user interface (205) provides information (or causes the presentation of the information) to the user to select the most desirable consumer account (146) to make the payment transaction by presenting the account information (142) of the consumer account (146) to the transaction terminal (105).

For example, the mobile application may identify the account (251) as the most desirable the consumer account (146) to make the payment transaction at the transaction terminal (105); and thus, in this example, the account (251) corresponds to the consumer account (146), and the account information (142) identifying the consumer account (146) is the account information (142) of account (251).

For example, based on the information presented in the user interface (205), the user may take out an account identification device (141) particularly configured to present the account information (142) of the consumer account (146), such as a payment card associated with the consumer account (146), to initiate the payment. The account identification device (141) is generally a device separate from the mobile device (201).

Alternatively, the mobile device (201) is configured in one embodiment as the account identification device (141) to present the account information (142). For example, based on the alert information presented in the user interface (205), the user may configured an account identification device (141) that is capable of presenting account information of the accounts (251, 253, . . . , 257) of the user, such as a mobile wallet (213) running as a mobile application in the mobile device (201), to particularly present the account information (142) of the consumer account (146) to maximize the loyalty reward benefits from the payment transaction, where the consumer account (146) is one of the accounts (251, 253, . . . , 257) identified by the mobile application as the top account for the transaction. For example, the alert information may prompt the user to confirm that the consumer account (146), selected from the accounts (251, 253, . . . , 257) as the best account to optimize the benefit of the transaction in accordance with the reward rules and/or user preferences, as the default card for the mobile wallet (213) running the mobile device; and once the user provides the input to confirm the option, the mobile wallet (213) is configured to automatically use the consumer account (146) to make subsequent transactions, as if the mobile wallet (213) had only the consumer account (146) as the only account in the mobile wallet, even though the mobile wallet (213) actually has a plurality of accounts (251, 253, . . . , 257). Thus, when the mobile wallet (213) is in a communication session with the transaction terminal (105) to present the account information (142), the mobile wallet (213) does not prompt the user to select an account from the mobile wallet (213) and thus reduces the time period of the communication session between the transaction terminal (105) and the mobile wallet (213).

In some embodiments, the mobile application (233) is implemented as part of the mobile wallet (213), or provided with access to the mobile wallet (213) to configure the default account to be presented by the mobile wallet (213). Thus, the mobile application (233) may present an alert in the user interface (205) to accept the change of the default account for the predicted payment transaction.

In one embodiment, the change in the setting of the default account in the mobile wallet (213) is activated only for the predicted payment transaction. After the predicted payment transaction, the mobile application (233) changes the setting back to the setting before the alert without a user input.

For example, prior to change the default account to the consumer account (146) that is determined by the mobile application (233) to maximize the benefit of the predicted payment transaction, the mobile application (233) stores the identification of the current default account (e.g., 253). After one transaction is performed, after a predetermined period of time, after a predicted time period to the predicted transaction, and/or after the mobile device is outside a predetermined range from the location of the transaction terminal), the mobile application (233) determines that the change of the default account to the consumer account (146) is no long valid and restores the setting to the prior default account (e.g., 253) according to the identification of the prior default account (e.g., 253) stored prior to the change. Thus, the user does not have to provide any input to the mobile application (223) and/or the mobile wallet (213) to restore the default account setting for the mobile wallet (213).

Figure 5:
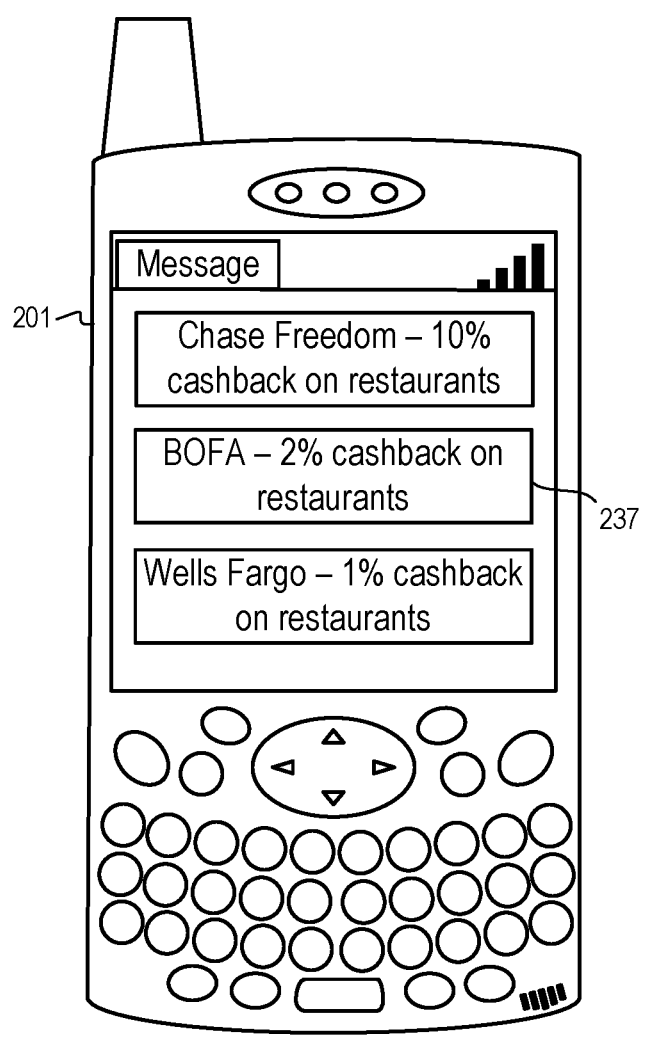
FIG. 5 shows a user interface presenting a mobile alert according to one embodiment.

FIG. 5 shows a user interface presenting a mobile alert according to one embodiment. In one embodiment, the user interface presents not only the top ranked account for the predicted payment transaction, but also alternatives and their benefit level indicators. Thus, the user has the option to select an account based on an informed decision.

For example, in one embodiment, the user may select the message (237) to indicate a user decision to make the next transaction using the consumer account (146) corresponding to the message (237). For example, the three messages illustrated FIG. 5 correspond to accounts (251, 253 and 257) respectively configured in the mobile wallet (213) running in the mobile device (201). When the user selects a corresponding message (e.g., 237), a corresponding account (e.g., 253) is set as the default account for the predicted transaction.

As illustrated in FIG. 5, each of the messages (e.g., 237) identifies an account (e.g., 253) and the benefit of using the account for the predicted transaction (e.g., a percentage of cashback).

In one embodiment, the user selection of the consumer account (146) causes the mobile wallet (213) to present the account information (142) of the consumer account (146) to the transaction terminal (105) in the next payment transaction.

In one embodiment, the mobile application (233) is configured to communicate the user selected account to the portal (143) of the transaction handler (103) to dynamically map the predicted transaction made using any of the accounts (251, 253, . . . , 257) to the user selected account. For example, in response to the user selecting of the consumer account (146) using the user interface illustrated in FIG. 5, the mobile application (233) transmits a message to the portal (143) which stores data to indicate a preference for the predicted transaction near the current location of the mobile device (201). Subsequent, the user may use any of the accounts (251, 253, . . . , 257) to make the payment transaction on the transaction terminal (105) (e.g., using the mobile wallet (213) without changing its default account, using a separate account identification device that presents account information (142) that is different from the account information of the user selected account). In response to detecting a subsequent payment transaction made with the transaction terminal (105) located in the vicinity of the current location of the mobile device (201) using any of the accounts (251, 253, . . . , 257), the transaction handler (103) is configured to cause the transaction to be conducted in the consumer account (146) selected by the user, based on the preference data stored for the predicted transaction.

For example, when the transaction is initiated with the transaction terminal (105) using the account information of (142) with an account (e.g., 251) that is different from the consumer account (146), the transaction handler (147) maps the transaction to the consumer account (146).

For example, after the message indication the user selection of the consumer account (146) for the predicted transaction is received in the portal (143) from the mobile application (233), the portal (143) is configured to generate a trigger record to detect a transaction with the merchant account (148) associated with the transaction terminal (105) in any of the accounts (251, 253, . . . , 257) of the user other than the consumer account (146). In response to an authorization request for such a transaction is received from the transaction terminal (105) via the acquirer processor (147) of the merchant account (148), the transaction handler (103) substitutes the account information (142) in the authorization request with the account information of the consumer account (146) to generate a modified authorization request and forwards the modified authorization request to the issuer processor (145) of the consumer account (146). Thus, the payment transaction is performed in the consumer account (146) even when the transaction is initiated with the transaction terminal (105) using the account information (142) of a different account (e.g., 257) of the user.

Figure 6:
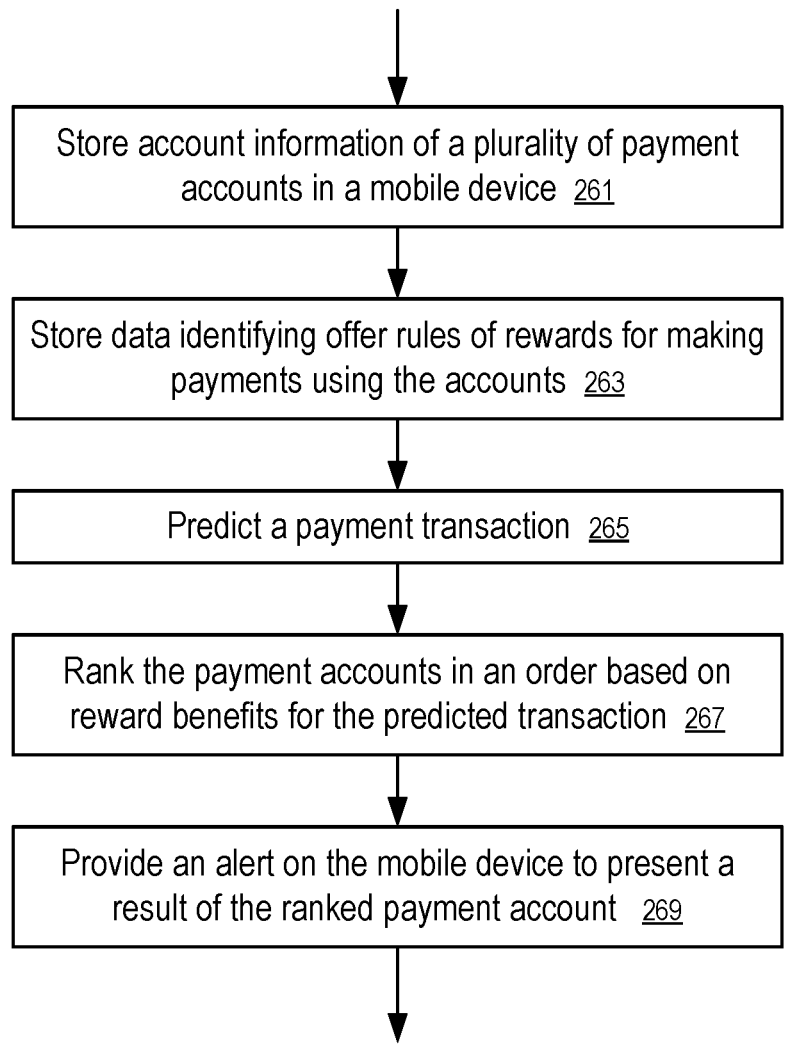
FIG. 6 shows a method to generate a mobile alert according to one embodiment.

FIG. 6 shows a method to generate a mobile alert according to one embodiment. For example, the method of FIG. 6 can be implemented in a system illustrated in FIGS. 4 and/or 2.

In FIG. 6, a mobile device (201) is configured to: store (271) account information of a plurality of payment accounts in the mobile device; store (273) data identifying offer rules of rewards for making payments using the accounts; predict (275) a payment transaction; rank (277)

the payment accounts in an order based on reward benefits for the predicted transaction; and provide (279) an alert on the mobile device to present a result of the ranked payment account, before the initiation of the payment transaction.

In one embodiment, systems and methods are provided to allow a cardholder to receive dynamic alerts in both mobile payments and digital platforms. It provides an insight on potential rewards benefits for a payment transaction before the purchase.

In one embodiment, the portal (143) is configured to calculate rewards percentages on major merchant categories and/or for enrolled accounts of users in various loyalty programs. The portal (143) pushes out calculated reward information to the mobile device (201) and digital payments.

In one embodiment, information is rolled out when the mobile device (201) or a payment system attempts to connect itself to the transaction handler (103) during provisioning or first time authorization for that account holder.

In one embodiment, the mobile alert is configured to inform the cardholder about the possible rewards to the payment accounts (251, 253, . . . , 257) a predetermined time period before the payment transaction is initiated, or when the mobile device (201) senses the POS terminal. The mobile alert provides the user with an opportunity to choose a payment account, based on the information provided in the alert, to generate the maximum benefit on the purchase.

For example, a user has four payment cards, identified as Chase Freedom, Bank of America, Macys, Wells Fargo respectively. The user is about to orders food in Panera bread for $100. The portal (143) and/or the mobile application (233) determines that the payment cards are ranked in the following order based cashback rewards.

Chase Freedom—10% cash back on restaurants
Bank of America—2% cash back on restaurants
Wells Fargo—x 1% cash back on restaurants
Macys—No rewards After the user enters Panera bread and is ready to initiate a payment transaction at Panera bread via NFC, the user is dynamically alerted on reward offers in descending order over the various payment cards.

As the alert recommends dynamically, the user selects Chase Freedom for purchase authorization and thereby receives $10 in cash back for purchase paid using the selected payment card.

New Rewards information is pushed to the mobile device (201) by the portal (143) the time of provisioning or when transaction gets routed to the transaction handler.

In one embodiment, the mobile application (233) is integrated within a mobile wallet (213) provided by an issuer of a payment account. The user may use the mobile wallet (213) to initiate a payment transaction. Before initiating the transaction, dynamically reward options on available accounts pop up; and the user is given a choice to choose a payment card that yields the best benefits.

In one embodiment, the functionality of the mobile application (233) can also be added to third party online and NFC wallets as well. The user may use the mobile wallet (213) to initiate a payment transaction. Rewards information on various payment cards will be provided by a rewards maximizer. Just before an order is placed or the authorization of a payment transaction, the user is provided with available rewards options on his various visa cards to avail the maximum benefits in return. Based on intended benefits, the user is provided with the opportunity to use the appropriate payment card for the purchase. The alerts will be dynamically flashed and up to date and more robust in nature. If the third party wallet has its own rewards system in place, the rewards maximizer will be integrated with it to make sure there is no overlap and always be beneficial to the cardholder, Issuer and Merchant/Acquirer.

In one embodiment, the rewards maximizer features can be added in online payments, such as Visa Checkout, Amazon payments, etc. Online purchases can be initiated with a payment card. The rewards maximizer will push rewards information on payment cards during provisioning or time of contact with the transaction handler to the online payment systems. The user will be alerted with dynamic reward information on the payment cards of the user and thereby use the payment card that is best for maximizing the reward benefits to make the payment.

In one embodiment, the rewards maximizer can send rewards information directly to a checkout system dynamically. New features can be developed in the checkout system to advise the cardholder on the rewards benefits incurred on available visa cards just before authorization. Cardholder can chose the best rewards issuer visa card for his/her purchase.

Inside the checkout system, the user will be prompted with choices of payment accounts dynamically just before the order is placed for purchase authorization.

The rewards maximizer can be used in mobile and/or digital payments that use QR code technology. Purchases can be initiated with the payment card and from the transaction handler. The reward maximizer will provide rewards information to the mobile device (201) during provisioning or time of contact with transaction handler (103). The user will receive alerts on rewards dynamically and optimize the opportunity to use a payment card best for the current payment transaction, or the payment transaction that is expected to be initiated.

In one embodiment, the transaction handler may issue a dummy card, which may be called a proxy card. Visa proxy card will have necessary attributes of regular account number but no direct access to funds/money. It is a unique identification number compatible to be linked to actual card numbers. The proxy card will be linked to multiple visa cards regardless of the issuers for an account holder.

When a user initiates a payment transaction using the proxy card through acquirer/merchant and the payment transaction reaches the transaction handler, the rewards maximizer links the card number to one of the accounts (251, 253, . . . , 257) of the user based on the best rewards/incentives offered by the issuers. Optimizing rewards among the accounts (251, 253, . . . , 257) will be built in a rewards maximizer module of the transaction handler. Rewards program information on various issuer cards will be provided by loyalty programs to the portal (143) of the transaction handler (103). With a chosen account (251, 253, . . . , or 257), the transaction handler (103) sends the authorization request to the respective issuer of the chosen account (251, 253, . . . , or 257). Based on the authorization result, the authorization response on the chosen account will be sent back from the issuer (145) to the transaction handler (103). The transaction handler (103) will link back the chosen account to the proxy card. From the transaction handler, the authorization response on the proxy card is sent back to the transaction terminal (105) via the acquirer (147). During clearing and settlement, the chosen account can be back mapped to the proxy card; and transaction can be cleared and settled between the issuer (145) of the chosen account (146) and the merchant account (148) smoothly.

In one aspect, a mobile device (201) of one embodiment includes: at least one microprocessor (209 or 173); a position determination device (e.g., 263 or 211) configured to determine a location of the mobile device; memory (163) configured to store: a mobile application (233) having instructions for the at least one microprocessor (209 or 173); and identification information (e.g., 142) of a plurality of accounts (251, 253, . . . , 257). The mobile device (201) further includes a user interface (205). The mobile application (233) running in the mobile device (201) is configured, in response to the location of the mobile device (201) determined by the position determination device (e.g., 263 or 211), to: predict a transaction based at least in part on the location of the mobile device (201); select, based at least in part on the location of the mobile device, a first account (146) for the transaction from the plurality of accounts (251, 253, . . . , 257) identified by the identification information (e.g., 142); and provide, via the user interface (205), an alert identifying the first account (146), before a user of the mobile device (201) begins to make the transaction.

In one embodiment, the mobile application (233) is configured to predict the transaction based at least in part on a distance between the location of the mobile device and a location of a transaction terminal (105) being within a threshold.

In one embodiment, the mobile application (233) is configured to: identify a motion characteristic of the mobile device (201); and compare the motion characteristic of the mobile device (201) to a predetermined motion pattern to make the prediction. Examples of such a motion characteristic of the mobile device (201) includes: a location trajectory towards the location of the transaction terminal, and a direction and a speed of the mobile device (201) approaching the transaction terminal (105).

In one embodiment, a transceiver (e.g., 207) of the mobile device (201) is configured to communicate with a transaction terminal (105) via near field communication. The transceiver (e.g., 207) is further configured to detect a signal from the transaction terminal (105) prior to a communication session with the transaction terminal (105); and the mobile application (233) is configured to predict the transaction based at least in part on the signal being detected by the transceiver (e.g., 207).

In one embodiment, a communication device (e.g., 203) of the mobile device (201) is configured to communicate with at least one server (e.g., 143, 223, 227) over internet. The mobile application (233) is configured to obtain, using the communication device (e.g., 203), data identifying a plurality of offers (e.g., 261, . . . , 263, . . . , 265) from a remote server (e.g., 143) and stored the data in the memory (e.g., as reward rules/preferences (215)); and the first account (146) is identified based at least in part on the data identifying the plurality of offers. For example, the mobile application (233) of one embodiment is configured to select the first account (146) from the plurality of accounts (251, 253, . . . , 257) by maximizing a benefit of the plurality of offers (261, . . . , 263, . . . , 265) to the transaction predicted based on the location of the mobile device (201).

In one embodiment, the mobile device has a transceiver (e.g., 207) configured to communicate with the transaction terminal (105) via near field communication. The mobile application (233) is further configured to: receive a user input in the user interface (205) to confirm a usage of the first account for the transaction; and instruct the transceiver (207) to provide identification data (e.g., 142) of the first account to the transaction terminal (105) via near field communication during a communication session for the predicted transaction. For example, the mobile application (233) of one embodiment includes a mobile wallet (213) configured to make a payment with the transaction terminal (105) during the communication session.

In one embodiment, the alert is configured to cause the user of the mobile device (201) to use an account identification device (141) of the first account (146), which is separate from the mobile device (201), to make the transaction.

FIG. 7 shows an electronic payment processing system according to one embodiment.

In FIG. 7, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 8:
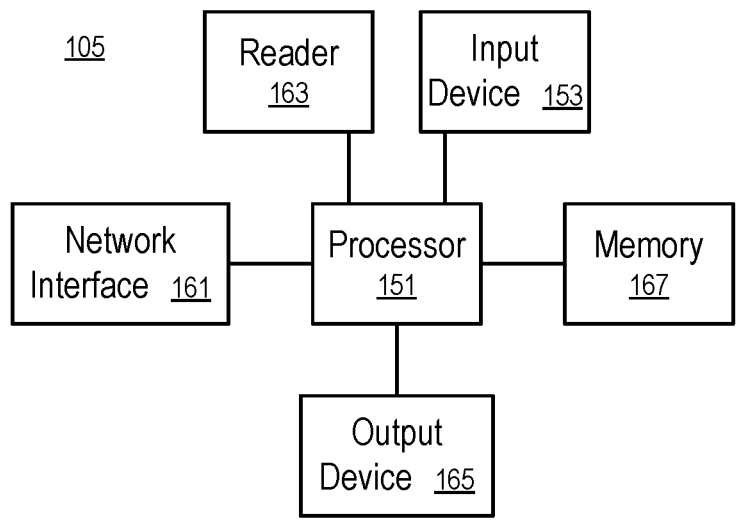
FIG. 8 illustrates a transaction terminal according to one embodiment.
Figure 9:
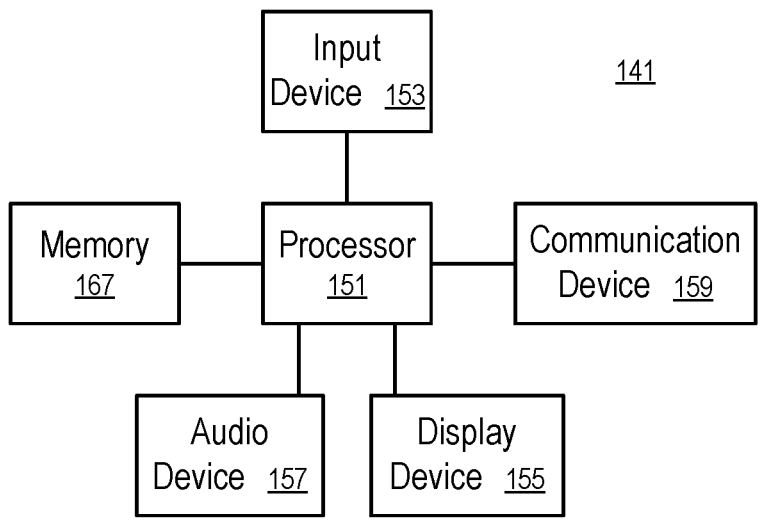
FIG. 9 illustrates an account identifying device according to one embodiment.
Figure 10:
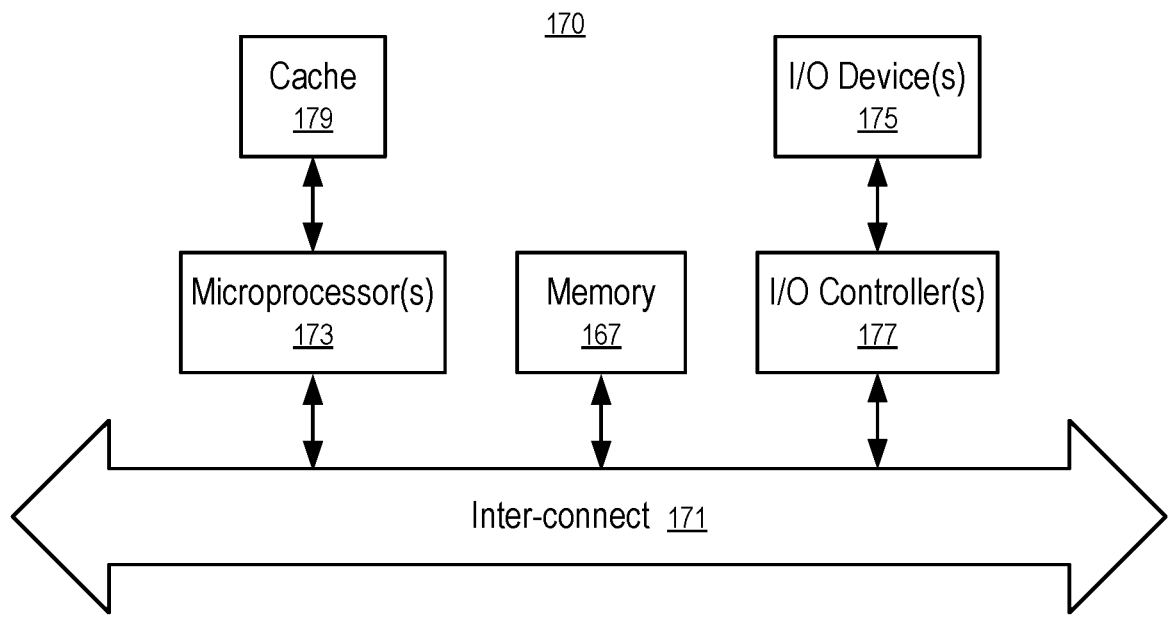
FIG. 10 illustrates a data processing system according to one embodiment.

FIGS. 8 and 9 illustrate examples of transaction terminals (105) and account identification devices (141). FIG. 10 illustrates the structure of a data processing system (170) that can be used to implement, with more or fewer elements, at least some of the components in the system, such as the transaction handler (103), the portal (143), the data warehouse (149), the account identification device (141), the transaction terminal (105), etc.

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

In one embodiment, the transaction handler (103) couples with a centralized data warehouse (149) organized around the transaction data. For example, the centralized data warehouse (149) may include, and/or support the determination of, spend band distribution, transaction count and amount, merchant categories, merchant by state, cardholder segmentation by velocity scores, and spending within merchant target, competitive set and cross-section.

For example, the centralized data warehouse (149) may include advertisement data and/or offers of benefits such as discount, reward, points, cashback, etc. The offers can be communicated to the users (e.g., 101) via the portal (143) or other communication channels.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

FIG. 7 shows an electronic payment processing system according to one embodiment.

In FIG. 7, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149).

The portal (143) is configured to communicate with user devices outside the electronic payment processing network. The portal (143) may be implemented as a web portal, a telephone gateway, a file/data server, etc.

In FIG. 7, the transaction terminal (105) initiates the transaction for a user (101) (e.g., a customer) for processing by a transaction handler (103). The transaction handler (103) processes the transaction and stores transaction data about the transaction, in connection with account data, such as the account profile of an account of the user (101). The account data may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data and the corresponding account data are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101), during a transaction, after a transaction, or when other opportunities arise.

In FIG. 7, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 7, the transaction handler (103) uses the data warehouse (149) to store the records about the transactions, such as the transaction records (301) or transaction data.

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 7, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 7, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, and entitled "Merchant Benchmarking Tool," the disclosure of which application is hereby incorporated herein by reference.

FIG. 8 illustrates a transaction terminal according to one embodiment. The transaction terminal (105) illustrated in FIG. 8 can be used in various systems discussed in connection with other figures of the present disclosure. In FIG. 8, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 8. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 8. For example, in one embodiment, the transaction terminal (105) is an ATM machine, which includes components to dispense cash under certain conditions.

FIG. 9 illustrates an account identifying device according to one embodiment. In FIG. 9, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 9, such as a cellular communications subsystem.

In one embodiment, the communication device (159) may access the account information (142) stored on the memory (167) without going through the processor (151).

In one embodiment, the account identification device (141) has fewer components than those illustrated in FIG. 9. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

In one embodiment, a mobile phone is configured to sort payment cards stored therein based on its location. After the mobile phone determines its current location coordinates via GPS, the mobile phone determines one or more parameters, such as the merchant category of payment transactions to be made at the current location. Based on the one or more parameters determined from the location, the mobile phone applies a set of rules to adjust the order of the payment cards in a mobile wallet implemented in the mobile phone based on optimization of potential rewards that are expected from the use of the payment cards. For example, the merchant category can be used to predict the loyalty rewards resulting from using the respective payment cards in the mobile wallet; and the order of the payment cards stored in the mobile phone can be adjusted to list the payment card that offers most rewards on the top.

In one embodiment, a method implemented in a mobile device includes: storing, in the mobile device, data identifying a plurality of payment accounts, each respective payment account of which is associated with a loyalty program that provides loyalty benefits for payment transactions made in the respective payment account; determining, by the mobile device, a location of the mobile device at a time of the making a payment at a point of sales terminal; identifying, by the mobile device, a merchant category of the payment based on the location of the mobile device; applying, by the mobile device, a set of predetermined rules based at least in part on the merchant category to determine an order of the plurality of payment accounts to optimize loyalty benefits generated from the payment; and processing, by the mobile device, the payment based on the order.

FIG. 10 illustrates a data processing system according to one embodiment. While FIG. 10 illustrates various components of a computer system, it is not intended to represent any particular architecture or manner of interconnecting the components. One embodiment may use other systems that have fewer or more components than those shown in FIG. 10.

In FIG. 10, the data processing system (170) includes an inter-connect (171) (e.g., bus and system core logic), which interconnects a microprocessor(s) (173) and memory (167). The microprocessor (173) is coupled to cache memory (179) in the example of FIG. 10.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/ or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
at least one processor programmed or configured to:
receive a location of a mobile device;
predict that a payment transaction is to be made involving a transaction terminal based on the location of the mobile device, wherein, when predicting that the payment transaction is to be made involving the transaction terminal, the at least one processor is programmed or configured to:
identify a distance between the location of the mobile device and a location of the transaction terminal;
compare the distance between the location of the mobile device and the location of the transaction terminal to a predetermined distance;
determine that the mobile device is within the predetermined distance of the location of the transaction terminal;
determine a time period during which the location of the mobile device has been within the predetermined distance of the location of the transaction terminal;
compare the time period during which the location of the mobile device has been within the predetermined distance of the location of the transaction terminal to a threshold of time;
determine that the time period during which the location of the mobile device has been within the predetermined distance of the location of the transaction terminal satisfies the threshold of time; and
predict that the payment transaction is to be made involving the transaction terminal based on determining that the mobile device is within the predetermined distance of the location of the transaction terminal and determining that the time period during which the location of the mobile device has been within the predetermined distance of the location of the transaction terminal satisfies the threshold of time;
identify an account of a plurality of accounts to be used in the payment transaction based on predicting that the payment transaction is to be made involving the transaction terminal; and
provide an alert identifying the account of the plurality of accounts before the payment transaction is initiated.

2. The system of claim 1, wherein, when receiving the location of the mobile device, the at least one processor is programmed or configured to:
receive the location of the mobile device from a position determination device, wherein the position determination device determines the location of the mobile device based on a global positioning system (GPS) signal.

3. The system of claim 1, wherein the at least one processor is further programmed or configured to:
identify a plurality of transaction terminals that are within the predetermined distance to the location of the mobile device;
identify the transaction terminal from the plurality of transaction terminals; and
determine a category of the transaction terminal, wherein, when identifying the account for the payment transaction from the plurality of accounts, the at least one processor is programmed or configured to:
identify the account for the payment transaction from the plurality of accounts based on the category of the transaction terminal.

4. The system of claim 3, wherein, when identifying the transaction terminal from the plurality of transaction terminals, the at least one processor is programmed or configured to:
identify the transaction terminal from the plurality of transaction terminals based on a communication history of the mobile device with each of the plurality of transaction terminals.

5. The system of claim 3, wherein, when identifying the account of the plurality of accounts to be used in the payment transaction, the at least one processor is programmed or configured to:
identify the account of the plurality of accounts to be used in the payment transaction based on an amount of reward benefits to be provided based on using the account in the payment transaction.

6. The system of claim 1, wherein the at least one processor is further programmed or configured to:
   track a timed-sequence of locations of the mobile device based on determining that the mobile device is within the predetermined distance of the location of the transaction terminal; and
   use the timed-sequence of locations of the mobile device to predict that the payment transaction is to be made involving the transaction terminal.

7. The system of claim 1, wherein, when receiving the location of the mobile device, the at least one processor is programmed or configured to:
   receive the location of the mobile device from a position determination device, wherein the position determination device determines the location of the mobile device based on a wireless beacon signal.

8. The system of claim 1, wherein, when providing the alert identifying the account of the plurality of accounts before the payment transaction is initiated, the at least one processor is programmed or configured to:
   provide a prompt to select the account of the plurality of accounts for the payment transaction before the payment transaction is initiated.

9. A method, comprising:
   receiving, with at least one processor, a location of a mobile device;
   predicting, with the at least one processor, that a payment transaction is about to be made involving a transaction terminal based at least in part on a distance between the location of the mobile device and a location of the transaction terminal, wherein predicting that the payment transaction is about to be made involving the transaction terminal comprises:
      identifying the distance between the location of the mobile device and the location of the transaction terminal;
      comparing the distance between the location of the mobile device and the location of the transaction terminal to a predetermined distance;
      determining that the mobile device is within the predetermined distance of the location of the transaction terminal;
      determining a time period during which the location of the mobile device has been within the predetermined distance of the location of the transaction terminal;
      comparing the time period during which the location of the mobile device has been within the predetermined distance of the location of the transaction terminal to a threshold of time;
      determining that the time period during which the location of the mobile device has been within the predetermined distance of the location of the transaction terminal satisfies the threshold of time; and
      predicting that the payment transaction is to be made involving the transaction terminal based on determining that the mobile device is within the predetermined distance of the location of the transaction terminal and determining that the time period during which the location of the mobile device has been within the predetermined distance of the location of the transaction terminal satisfies the threshold of time;
   identifying, with the at least one processor, an account to be used in the payment transaction based on predicting that the payment transaction is to be made involving the transaction terminal; and
   providing, with the at least one processor, an alert identifying the first account to be used in the payment transaction before the payment transaction is initiated.

10. The method of claim 9, wherein receiving the location of the mobile device comprises:
   receiving the location of the mobile device from a position determination device, wherein the position determination device determines the location of the mobile device based on a global positioning system (GPS) signal.

11. The method of claim 9, wherein the method further comprises:
   identifying a plurality of transaction terminals that are within the predetermined distance to the location of the mobile device;
   identifying the transaction terminal from the plurality of transaction terminals; and
   determining a category of the transaction terminal,
   wherein identifying the account to be used in the payment transaction comprises:
      identifying the account for the payment transaction from a plurality of accounts based on the category of the transaction terminal.

12. The method of claim 11, wherein identifying the transaction terminal from the plurality of transaction terminals comprises:
   identifying the transaction terminal from the plurality of transaction terminals based on a communication history of the mobile device with each of the plurality of transaction terminals.

13. The method of claim 11, wherein identifying the first account to be used in the payment transaction comprises:
   identifying the first account to be used in the payment transaction based on an amount of reward benefits to be provided based on using the first account in the payment transaction.

14. The method of claim 11, wherein the alert identifying the first account to be used in the payment transaction comprises:
   providing a prompt to select the first account from a plurality of accounts for the payment transaction before the payment transaction is initiated.

15. A computer program product, the computer program product comprising at least one non-transitory computer-readable medium including one or more instructions that, when executed by at least one processor, cause the at least one processor to:
   receive a location of a mobile device;
   predict that a payment transaction is to be made involving a transaction terminal based on the location of the mobile device, wherein, the one or more instructions that cause the at least one processor to predict that the payment transaction is to be made involving the transaction terminal, cause the at least one processor to:
      compare a distance between the location of the mobile device and a location of the transaction terminal to a predetermined distance;
      determine that the mobile device is within the predetermined distance of the location of the transaction terminal;
      determine a time period during which the location of the mobile device has been within the predetermined distance of the location of the transaction terminal;
      compare the time period during which the location of the mobile device has been within the predetermined distance of the location of the transaction terminal to a threshold of time;

determine that the time period during which the location of the mobile device has been within the predetermined distance of the location of the transaction terminal satisfies the threshold of time; and predict that the payment transaction is to be made involving the transaction terminal based on determining that the mobile device is within the predetermined distance of the location of the transaction terminal and determining that the time period during which the location of the mobile device has been within the predetermined distance of the location of the transaction terminal satisfies the threshold of time;

identify an account of a plurality of accounts to be used in the payment transaction based on predicting that the payment transaction is to be made involving the transaction terminal; and provide an alert identifying the account of the plurality of accounts before the payment transaction is initiated.

16. The computer program product of claim 15, wherein the one or more instructions further cause the at least one processor to:
    identify a plurality of transaction terminals that are within the predetermined distance to the location of the mobile device;
    identify the transaction terminal from the plurality of transaction terminals; and
    determine a category of the transaction terminal,
    wherein the one or more instructions that cause the at least one processor to identify the account for the payment transaction from the plurality of accounts, cause the at least one processor to:
        identify the account for the payment transaction from the plurality of accounts based on the category of the transaction terminal.

17. The computer program product of claim 16, wherein the one or more instructions that cause the at least one processor to identify the transaction terminal from the plurality of transaction terminals, cause the at least one processor to:
    identify the transaction terminal from the plurality of transaction terminals based on a communication history of the mobile device with each of the plurality of transaction terminals.

18. The computer program product of claim 16, wherein the one or more instructions that cause the at least one processor to identify the account of the plurality of accounts to be used in the payment transaction, cause the at least one processor to:
    identify the account of the plurality of accounts to be used in the payment transaction based on an amount of reward benefits to be provided based on using the account in the payment transaction.

19. The computer program product of claim 15, wherein the one or more instructions further cause the at least one processor to:
    track a timed-sequence of locations of the mobile device based on determining that the mobile device is within the predetermined distance of the location of the transaction terminal; and
    use the timed-sequence of locations of the mobile device to predict that the payment transaction is to be made involving the transaction terminal.

20. The computer program product of claim 15, wherein the one or more instructions that cause the at least one processor to receive the location of the mobile device, cause the at least one processor to:
    receive the location of the mobile device from a position determination device, wherein the position determination device determines the location of the mobile device based on a global positioning system (GPS) signal.

* * * * *